United States Patent
Okuyan et al.

(10) Patent No.: US 12,056,852 B2
(45) Date of Patent: Aug. 6, 2024

(54) NOISE ELIMINATION METHOD FOR DETECTION APPLICATIONS

(71) Applicant: ASELSAN ELEKTRONIK SANAYI VE TICARET ANONIM SIRKETI, Ankara (TR)

(72) Inventors: Erkan Okuyan, Ankara (TR); Tolga Aksoy, Ankara (TR); Engin Uzun, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 424 days.

(21) Appl. No.: 17/540,267

(22) Filed: Dec. 2, 2021

(65) Prior Publication Data

US 2022/0180481 A1    Jun. 9, 2022

(30) Foreign Application Priority Data

Dec. 4, 2020    (TR) .................................. 2020/19736

(51) Int. Cl.
| | |
|---|---|
| *G06T 5/00* | (2024.01) |
| *G06T 3/18* | (2024.01) |
| *G06T 5/70* | (2024.01) |
| *G06V 10/25* | (2022.01) |

(52) U.S. Cl.
CPC .................. *G06T 5/70* (2024.01); *G06T 3/18* (2024.01); *G06V 10/25* (2022.01)

(58) Field of Classification Search
CPC .. G06T 5/70; G06T 3/18; G06V 10/25; G06V 2201/07; G06V 10/30; G06V 20/60
See application file for complete search history.

(56) References Cited

U.S. PATENT DOCUMENTS

| | | | |
|---|---|---|---|
| 10,635,943 B1* | 4/2020 | Lebel | G06T 5/50 |
| 2011/0080480 A1* | 4/2011 | Dufour | G06V 10/30 |
| | | | 382/103 |
| 2012/0154579 A1* | 6/2012 | Hampapur | G06T 7/223 |
| | | | 382/103 |
| 2015/0213616 A1* | 7/2015 | Kappeler | G01N 15/1429 |
| | | | 348/92 |
| 2017/0206669 A1* | 7/2017 | Saleemi | G06T 11/206 |
| 2019/0104940 A1* | 4/2019 | Zhou | G06T 11/008 |
| 2019/0377047 A1* | 12/2019 | Chen | G01R 33/5608 |
| 2020/0058106 A1* | 2/2020 | Lazarus | G06V 10/82 |
| 2020/0305806 A1* | 10/2020 | Tang | A61B 6/032 |
| 2021/0012543 A1* | 1/2021 | Hein | G06T 11/005 |
| 2021/0145393 A1* | 5/2021 | Gao | G06N 3/08 |
| 2021/0295474 A1* | 9/2021 | Wang | G16H 30/40 |
| 2021/0302525 A1* | 9/2021 | Mandava | G06T 7/0012 |
| 2022/0028133 A1* | 1/2022 | Ewald | G01R 33/4806 |

* cited by examiner

*Primary Examiner* — Van D Huynh
(74) *Attorney, Agent, or Firm* — Bayramoglu Law Offices LLC

(57) ABSTRACT

A noise elimination method for detection applications to increase performance, robustness and efficiency is provided. The noise elimination method including the following steps of; initialization; candidate generation; obtain sensor data; obtain a transformation matrix; warping candidate signals into a Cumulative Signal Frame (CSF); get a next candidate; process a last candidate; query a set handler; add the candidate signals into the set handler; warp the candidate signals onto the CSF; add the candidate signals to the CSF at a warped position; process the CSF; interpret the CSF and generate target candidates; detect decisions and terminate.

16 Claims, 1 Drawing Sheet

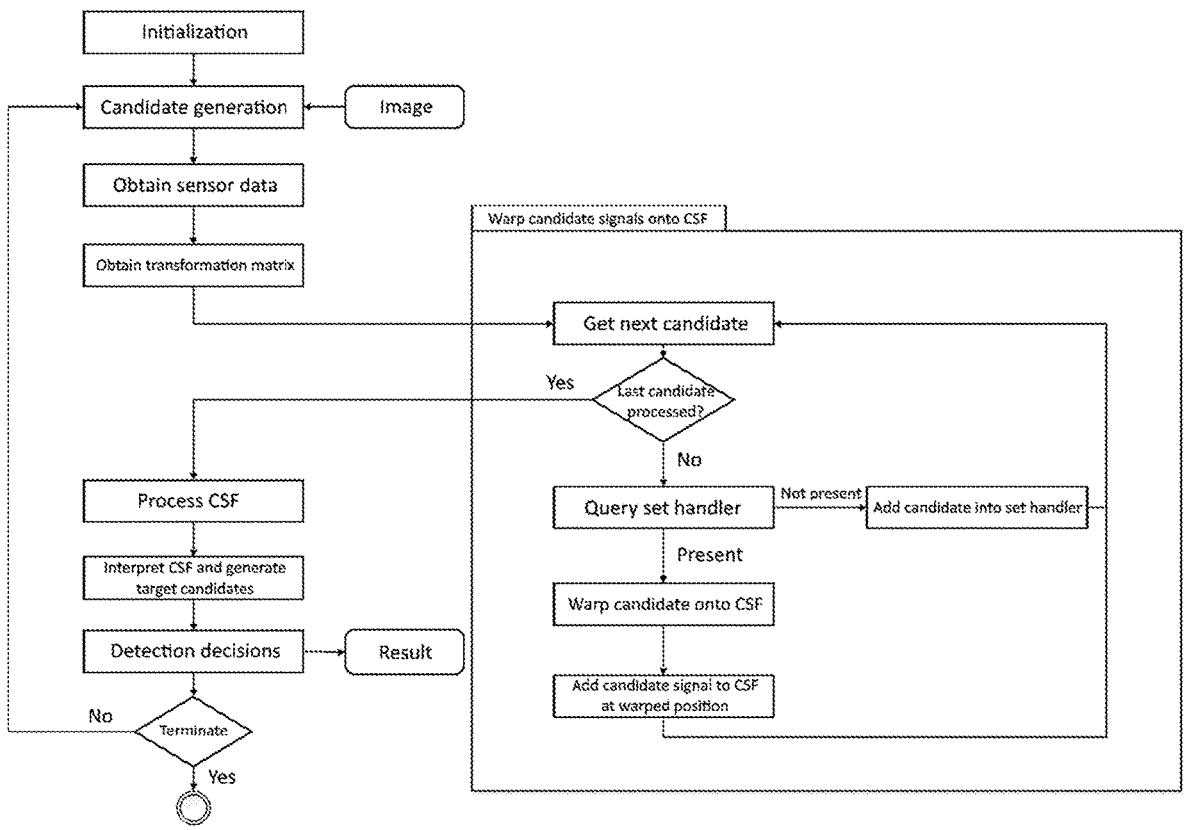

NOISE ELIMINATION METHOD FOR DETECTION APPLICATIONS

CROSS REFERENCE TO THE RELATED APPLICATIONS

This application is based upon and claims priority to Turkish Patent Application No. 2020/19736, filed on Dec. 4, 2020, the entire contents of which are incorporated herein by reference.

TECHNICAL FIELD

The present disclosure relates to a noise elimination method for detection applications to increase performance, robustness and efficiency.

The present disclosure specially relates to a noise elimination method for detection applications, where a data structure capable of fast and efficient membership tests is utilized. Candidates obtained from each frame are tested with the data structure responsible for membership tests to see if prior occurrence of the same candidate took place. If so candidate is processed, otherwise candidate is marked as seen in the data structure. Since candidates produced by noise in the frame are more likely to be blocked by the membership tests than candidates belonging to the object of detection, present disclosure is likely to improve detection performance.

BACKGROUND Achieving robust and efficient detection over a sequence of images is a very important task for many computer vision applications. There are many proposed methods for detection in the literature, focusing on different application areas. Some of the applications that these different proposed detection methods focus on are small target detection, surveillance, moving object detection etc. Details and implementations of the detection methods focusing on different application areas may differ but they share many common objectives. All of these detection methods are evaluated with certain metrics of success such as high detection rate, low false alarm rate and short processing time.

Detection methods may work on many different types of images such as day-TV, thermal and IR. Each sensor technology (and to a lesser extend each device using the technology) produce images with different noise characteristics. These noise characteristics may be very performance degrading for some of the application mentioned. For example, salt and pepper noise could increase false alarm rate drastically for small target detection applications. Furthermore, each application area requires a scenario of usage (such as heavy cluttered area, a scenario with glints etc.). Each scenario creates its own challenges such as handling low signal to clutter ratio, handling exceptional cases etc. Thus, handling negative effects of noise while satisfying application related challenges becomes a very important task to achieve high detection rate, low false alarm rate and short processing time.

There are well known methods for calculating position of an object of interest on a sequence of images in the state of the art. Without losing generality, an example object detection system would carry out the following steps of calculations: Candidate pixels which have high probability to belong to the object of interest need to be calculated. Sensor information regarding the position and orientation of the camera needs to be retrieved. A matrix (possibly a two dimensional array) to store the accumulated signal belonging to the scene needs to be defined. Candidate positions are warped using position and orientation of the camera onto signal matrix, so that signal belonging to the object is accumulated on the matrix. The signal matrix is then processed to find the regions associated with object of interest. These regions are processed further and a position belonging to the object of interest is produced.

However, noise present on the image may cause many problems for such example systems. For instance, performance of candidate generation step can be affected greatly and negatively in the presence of salt and pepper noise, column noise or any other effects like clutter. Another problem may be seen at the stage of region calculation associated with the object of interest. In the presence of noise, both the signal belonging to noise as well as the signal belonging to the object are accumulated in the matrix. Thus, the regions calculated from the matrix are not well defined, so target position produced using the region information is less reliable.

The United States patent document US20170206669A1 discloses a state of the art object detection and tracking system for videos. In an embodiment, a method of detecting and tracking an object of interest is described. Multiple frames of images are captured by the computing device via an image capturing device. Then, computing device calculates the object of interests for each frame. Multiple frames of object detections are then accumulated by the computing device to create object tracks based on batch of object detections over multiple frames. However, while the document is proposing a complete and state of the art object detection and tracking method, it completely omits effects of noise to the system and does not propose a noise elimination method for detection.

Another patent document US20150213616A1 proposes a method for an automated detection of objects in a fluid of a receptacle from sequential frames of image data. In the document, negative effects of noise to the method are stated and a temporal filtering of pixels is used. A certain number of frames preceding, a certain number of frames following and the frame of interest is used for filtering. However, the following trade-off should be noted: choosing too many preceding and/or following frames causes slow changes to the static part of the image while choosing too little causes ineffective elimination of noise. In addition, usage of following images causes a latency for real time applications.

The application numbered US20120154579A1 proposes a method for detection and tracking of moving objects. The patent document mentions about negative effects of heavy stripe noise. To eliminate such effect, one or more embodiments include forward/backward frame-to-frame registration. Then multi-frame differencing is used to eliminate the noise.

The mentioned methods do not lead a way of achieving optimum detection performance in the presence of negative effects such as noise. For some detection applications, negative effects of noise are altogether ignored. In some other cases, a pre-computation step is used to eliminate noise independent of the application at the cost of side objectives such as responsiveness and latency (because of usage of multiple frames and filtering for noise elimination). A new method of noise elimination heavily integrated to the detection application is needed to increase performance of noise elimination. A new methodology that is aiming to alleviate such a negative effect and to provide a good all-around solution needs to be proposed.

SUMMARY

The present invention is a noise elimination method for detection applications to increase performance, robustness and efficiency in the presence of negative effects like noise. The noise elimination method for detection applications fundamentally comprises the following steps of; initialization; candidate generation; obtain sensor data; obtain transformation matrix; warp candidate signals into CSF; get next candidate; last candidate processed; query set handler; add candidate into set handler; warp candidate onto CSF; add candidate signal to CSF at warped position; process CSF; interpret CSF and generate target candidates; detection decisions and terminate.

The invention aims to satisfy the specified constraints of the application such as using minimum amount of time and using minimum amount of memory while improving the performance of the application. Another objective of the present invention is to work with detection routine in an integrated manner, so that eliminated noise (pixels or regions) are selected among candidates generated by the detection method.

BRIEF DESCRIPTION OF THE DRAWINGS

FIGURE shows the flowchart of the presented embodiment of the present invention.

DETAILED DESCRIPTION OF THE EMBODIMENTS

In the first step, initialization of the noise elimination method for detection applications takes place. In this step, initialization of some parameters is carried out. Cumulative signal frame (CSF) is a parameter of the method, which is used to keep track of the accumulated signal belonging to the scene to be evaluated for the detection of the object of interest. Allocation of CSF should be handled in this initial step and this could be done in many ways. In one of the preferred configuration of the present invention a plain two dimensional array is used to store CSF data. In another preferred configuration of the present invention a data structure is used to keep track of the elements in the CSF (to save memory in case we expect CSF to be very sparse). Initialization of the CSF is also carried out in the initial step. Initialization of the CSF should be carried out such that at the start of the method no accumulated signal is present. For example: for a 2d matrix representation of the CSF, each element is assigned a zero value at the initialization step; for the data structure representation of the CSF, data structure is left intentionally empty to indicate no position in the CSF yet stores any accumulated signal. Set handler (SH) is a method parameter (and it is implemented essentially as a one dimensional array), which allows insertion and query of a candidate into/over SH. Queries over SH may produce false positives (a data can be said to be present in the SH even though it has not been inserted) but never false negatives (as the result of query if the item is said to be not inserted into SH, it is certainly is not inserted into SH). Details and usage of SH will be detailed in later stages of the document. Allocation of SH is done in the initial stage. Even though SH is a very memory efficient structure, there is an inherent trade-off between false positive rate of the queries and the size of the allocation. In one of the preferred configurations of the invention, allocation size of the SH is kept larger so that false positives are kept to a minimum and improve detection performance. Yet in another preferred configuration of the present invention allocation size of the SH is kept smaller so that memory footprint of the application is kept smaller. Initialization of SH is essentially assignment of zero values to every element of SH array.

In next step, calculation of candidate pixels (which corresponds to the pixels in the image that have high probability of belonging to the object of interest) takes place. There are well known methods for obtaining positions of such pixels in the state of the art, such as contrast based, shape based methods and histogram based methods. Contrast based methods labels pixels according to its prominence in the scope of contrast. Standard deviation is the main metric used in this kind of methods. Shape based methods labels pixels according to its similarity in the scope of shape/pattern. In this kind of methods, specific shape/pattern is expected in the pixels to be assigned as a candidate. Histogram based methods label pixels according to its similarity in the scope of histogram characteristics. Histogram based methods generate candidates by finding pre-defined correlation between expected and obtained histogram. Aside from the methods, the implementation of the methods also may vary. Some methods are wholly implemented to be executed over a processor while some other implementations use co-processors like FPGA or GPU. Without losing generality, any and all modes and implementations of the methods to calculate candidate pixels could be used for the present invention.

In third step, obtaining the sensor data which effectively corresponds to position and orientation of the camera takes place. Aforementioned sensor data may originate from many different devices such as inertial measurement unit (IMU), accelerometer and encoder. All or some subset of such information (or in fact none of it) may be used for the detection application at hand. In next, the information gathered from such devices are combined to form a transformation matrix (TM) (which is an identity matrix if no sensor data is used). TM effectively corresponds to the transfer function that will be applied to warp candidate pixels into CSF and keeps rotational and translational movement of the camera with respect to a reference time (i.e. keeps movement data of the camera for a certain time interval so that candidates obtained from the current image can be warped back to the reference frame position).

Later on, warping of candidates onto CSF takes place. This is effectively a matrix vector multiplication where vector represents the position of the candidate being warped and matrix is the TM calculated in the previous step. Each warped position and corresponding signal are used for accumulating signal into CSF. However, usage of SH (Set Handler) and accumulation of signal over CSF needs to be detailed. The detailed view of this step includes the actual warping process as well as SH query step, SH insertion step, and signal accumulation step onto CSF. Firstly, the next candidate to be warped onto CSF is obtained. If next candidate retrieval is not successful (all the candidates have been processed), execution continues with processing CSF. If there is a candidate to process (to be warped), execution continues with query set handler.

As previously mentioned, SH is a data structure that allows insertion and query operations for candidates. SH is essentially implemented as a one dimensional array and uses a plurality of hash functions ($H_1, H_2 \ldots$). Here, a hash function is a function that maps inputs onto an output range in a seemingly random manner. However, always same output is generated for the same input. For the insertion of candidates ($C_1, C_2 \ldots$) into SH, hash values (calculated by hash functions) of candidates are used. If we assume SH is essentially a bit array, each hash value corresponds to a seemingly random bit position of SH, i.e., mod ($H_i(C_j)$, size (SH)) does correspond to a bit position in SH. For insertion of a candidate $C_j$, all hash values of the candidate ($H_1(C_j)$, $H_2(C_j), \ldots$) needs to be calculated. Then, each bit position $H_1(C_j)$, $H_2(C_j)$, ... in SH is set to 1. For the query operation of a candidate over SH, each hash values of the candidate ($H_1(C_j)$, $H_2(C_j)$, ... ) needs to be calculated. If all bit positions corresponding to ($H_1(C_j)$, $H_2(C_j)$, ... ) have value of 1, the method assumes candidate has being inserted to the SH previously. Otherwise (all bit positions do not have value 1) the method concludes has not being inserted in SH yet.

There are two main points that needs to be stressed about query of a candidate over SH. Firstly, if a candidate is concluded to be not present in the SH (not inserted previously into SH) it is certainly correct. It is because, if the candidate has been inserted to the SH, exactly same hash values needs to be calculated from the candidate (since candidates' value and the hash functions are the same between insertion and the query). Thus, any one bit position in SH not having value 1 is not possible if a candidate is previously inserted, i.e., false negatives cannot occur. However, during the query of a candidate, if all bit positions corresponding to a hash value of a candidate contains value 1, there is a possibility that the candidate has not been inserted into SH yet, i.e., a false positive occurs. An example of such case can be stated as follows: There are 2 hash functions ($H_1$, $H_2$), 3 distinct candidates ($C_1$, $C_2$, $C_3$) and length of SH is 4 (initially SH has value of 0000). Then $C_1$ is inserted into SH (with values $H_1(C_1)=1$, $H_2(C_1)=3$) and change SH value to 1010. Then $C_2$ is inserted into SH (with values $H_1(C_2)=1$, $H_2(C_1)=2$) and change SH value to 1110 (position of $H_1(C_2)=1$ was already 1 so no change needs to occur). Then a query of $C_3$ over SH (with values $H_1(C_3)=2$, $H_2(C_3)=3$) is calculated and found that all SH positions corresponding to hash values are 1. In this case, $C_3$ is falsely assumed to be inserted into SH (however positions 2 and 3 are not set before together). To avoid such conditions, length of SH needs to be large enough to minimize false positives; yet it should be small enough to be memory efficient. Furthermore, quality of hash functions is also crucial. Hash function needs to map the input set of candidates onto SH bit positions in a statistically uniform manner to minimize false positives.

Furthermore, without losing generality, it is possible to use more than 1 bit for each position in SH (for example: if 2 bits is allocated for each position, max value for each position is 3). Then in the insertion step, a position in SH is incremented (if it is at max value determined by available bits for each bit position, its left as is). Then in the query step, if each position of SH has max value it is assumed that the candidate is inserted into SH (at least) max value times. However, if each position of SH doesn't have max value, it's concluded that the candidate is not inserted into SH max value times. Like the single bit version, for the multi bit version false negatives are impossible while false positives are possible. In one of the preferred embodiment of the present invention, a single bit of SH region is used for each possible hash value to make the system more space efficient. In another preferred embodiment of the present invention, multiple bit of SH region is used for each possible hash value to make the system more resilient to noise in the image. Yet in another preferred embodiment of the present invention, SH is periodically reinitialized (to empty) to avoid crowding the SH as a result of many candidate insertions/camera position change/object position change etc.

For the remainder of this document, the method has been explained as if a single bit version of SH is used. However, any discussion made for single bit version is extendible to multi bit SH and max value times insertion of candidates, in the light of information given in previous paragraph.

In step of query set handling, whether or not the candidate (position of the candidate) have been inserted in the SH previously is calculated to eliminate candidates belonging to a noise source. If the candidate's query over the SH returns true (i.e., the candidate has been inserted into SH previously), it is a strong indication that the candidate may belong to object of interest in the image. Since, it is expected to obtain candidates from the object of interest many times (from the same position) over previous frames, presence of the candidate on the SH indicates a lower probability of candidate belonging to a noise source. On the other hand, if the candidate's query over the SH returns false (i.e., the candidate has not been inserted into SH yet), it is an indication that the candidate may belong to noise source or it is the first observation of the candidate from the object of interest. If the candidate does belong to a noise source, eliminating the candidate is beneficial, otherwise (it is a first occurrence) subsequent images will produce the same candidate many times. If a candidate is not present in SH, the candidate is marked efficiently by inserting the candidate into SH. If this path is taken, the candidate is not processed further, since this candidate may belong to a noise source. However, if a candidate is present in SH, the candidate is processed further warping onto CSF (since this candidate has high probability of belonging to object of interest).

In step of warping candidates onto CSF, the TM (transformation matrix) which is calculated while obtaining transformation matrix is used along with the candidate. This warping procedure is effectively a matrix vector multiplication where vector represents the position of the candidate being warped and matrix is the TM. After obtaining the warped position in the step, addition of the candidate signal to CSF takes place. This can be done in multiple ways. If CSF is stored as a simple 2D matrix, addition is a simple operation at specific warped indices. If CSF is stored as a data structure (such as a tree structure), specific warped indices is searched. Then, addition of candidate signal is carried out on the found node of CSF data structure. Execution continues with getting next candidate.

In step of processing CSF, accumulated signal is converted to more meaningful form to process to be used in the next step. This is compulsory especially for the cases of moving object of interest. Because this type of objects generates a pixel cluster. In order to handle these clusters, in one of the preferred embodiment of the present invention, a k-means clustering method is employed. In another preferred embodiment of the present invention, connected components are calculated to obtain pixel clusters. Center of candidate object of interests are obtained at the end of this step.

Later on, previously found center of candidate object of interests are interpreted and target candidates are generated. In the interpretation procedure, signal centers (center of candidate object of interests) are watched for multiple frames. In one of the preferred embodiment of the invention, probabilistic data association based methods could be used in order to watch the signals. Then, the result of this watching procedure is used in detecting decisions. Decision takes place about whether or not the candidate is the expected object of interest. This decision could be made based on many different criteria. In one of the preferred embodiment of the present, invention a lifetime criteria of the received results from previous step can be used. In another embodiment of the present invention, a signal based criteria can be used so that the detection with signal characteristic closer to expected signal characteristic of object of interest is declared.

A noise elimination method for detection applications can detect object of interest in the scene and do this by eliminating the negative effects of noise in an integrated manner with the detection process. The method gathers data from the detection routine to be used as input and the method becomes specifically compatible with the detection routine used in the present embodiment. Thus, the method increases the performance of detection routine in presence of noise. The method has inherent embedded tradeoff between increasing noise elimination performance (via increasing SH size, using multiple bits for each position of SH) and decreasing memory footprint. Thus, the method is easily configurable to meet the needs the application at hand.

What is claimed is:

1. A noise elimination method for detection applications, comprising the following steps:
    allocating, in memory, a set handler and a cumulative signal frame to keep track of an accumulated signal belonging to a scene to be evaluated for a detection of an object of interest,
    calculating, using at least one processor, candidate pixels in an image, wherein the candidate pixels have high probability of belonging to the object of interest,
    obtaining sensor data, wherein the sensor data effectively corresponds to a position and an orientation of a camera,
    combining, using the at least one processor, information gathered from sensors to form a transformation matrix,
    warping, using the at least one processor, the candidate pixels onto the cumulative signal frame,
    converting, using the at least one processor, the accumulated signal to obtain a center of candidate object of interests,
    generating, using the at least one processor, target candidates by watching the center of the candidate object of interests for a plurality of frames,
    deciding, using the at least one processor, whether or not the target candidates are an expected object of interest, and
    outputting a result of the decision of whether or not the target candidates are an expected object of interest,
    wherein a size allocated for the set handler is configurable to guide a tradeoff between efficiency of the memory and a false positive rate of the set handler.

2. The noise elimination method according to claim 1, wherein the step of warping the candidate pixels onto the cumulative signal frame comprising:
    obtaining a candidate pixel to be warped when available,
    querying the candidate pixel over the set handler,
    inserting the candidate pixel into the set handler when the candidate pixel is not found in the set handler,
    warping the candidate pixel onto the cumulative signal frame when the candidate pixel is found in the set handler, and
    adding the candidate pixel to the cumulative signal frame at a warped position.

3. The noise elimination method according to claim 2, comprising processing a next candidate for detection purposes only when the candidate pixel is available in the set handler.

4. The noise elimination method according to claim 1, wherein the set handler is cleared periodically to avoid crowding the set handler and to avoid increasing a rate of non-inserted pixels evaluated as inserted.

5. The noise elimination method according to claim 1, wherein a plurality of bits are used for each slot in the set handler to increase a noise elimination capability.

6. The noise elimination method according to claim 1, wherein a single bit used for each slot in the set handler to decrease a memory footprint.

7. The noise elimination method according to claim 1, wherein probabilistic data association based methods are used in order to watch the candidate pixels for generating the target candidates.

8. The noise elimination method according to claim 2, wherein the set handler is cleared periodically to avoid crowding set handler and to avoid increasing a rate of non-inserted pixels evaluated as inserted.

9. The noise elimination method according to claim 3, wherein the set handler is cleared periodically to avoid crowding set handler and to avoid increasing a rate of non-inserted pixels evaluated as inserted.

10. The noise elimination method according to claim 2, wherein a plurality of bits are used for each slot in the set handler to increase a noise elimination capability.

11. The noise elimination method according to claim 3, wherein a plurality of bits are used for each slot in the set handler to increase a noise elimination capability.

12. The noise elimination method according to claim 4, wherein a plurality of bits are used for each slot in the set handler to increase a noise elimination capability.

13. The noise elimination method according to claim 2, wherein a single bit used for each slot in the set handler to decrease a memory footprint.

14. The noise elimination method according to claim 3, wherein a single bit used for each slot in the set handler to decrease a memory footprint.

15. The noise elimination method according to claim 4, wherein a single bit used for each slot in the set handler to decrease a memory footprint.

16. The noise elimination method according to claim 5, wherein a single bit used for the each slot in the set handler to decrease a memory footprint.

* * * * *